US007013457B2

(12) United States Patent
Chiang et al.

(10) Patent No.: US 7,013,457 B2
(45) Date of Patent: Mar. 14, 2006

(54) PRIORITIZED DEBUGGING OF AN ERROR SPACE IN PROGRAM CODE

(75) Inventors: Tai-Ying Chiang, Taipei Hsien (TW); Jing-Yang Jou, Hsin-Chu (TW); Ming-Chih Lai, Taipei Hsien (TW); Jien-Shen Tsai, Taipei (TW)

(73) Assignee: Springsoft, Inc., Hsinchu (TW)

( * ) Notice: Subject to any disclaimer, the term of this patent is extended or adjusted under 35 U.S.C. 154(b) by 746 days.

(21) Appl. No.: 09/682,140

(22) Filed: Jul. 26, 2001

(65) Prior Publication Data

US 2004/0205717 A1 Oct. 14, 2004

(51) Int. Cl.
*G06F 9/44* (2006.01)

(52) U.S. Cl. ...................... 717/131; 717/132; 717/133; 717/144; 717/127

(58) Field of Classification Search ......... 717/124–133
See application file for complete search history.

(56) References Cited

U.S. PATENT DOCUMENTS 4,763,277 A * 8/1988 Ashford et al. ............... 706/47
4,788,531 A * 11/1988 Corwin et al. .............. 340/945
5,086,429 A * 2/1992 Gray et al. ................... 714/13
5,210,859 A * 5/1993 Aoshima et al. .............. 714/46
5,297,150 A * 3/1994 Clark .......................... 714/26
5,463,768 A * 10/1995 Cuddihy et al. .............. 714/37
5,491,631 A * 2/1996 Shirane et al. ................ 701/35
5,854,925 A * 12/1998 Shimomura ................. 717/128
6,012,152 A * 1/2000 Douik et al. .................. 714/26
6,014,598 A * 1/2000 Duyar et al. .................. 701/29
6,076,083 A * 6/2000 Baker .......................... 706/52
6,173,440 B1 * 1/2001 Darty ......................... 717/130
6,289,264 B1 * 9/2001 Zenke ........................ 700/245

* cited by examiner

*Primary Examiner*—Kakali Chaki
*Assistant Examiner*—William H. Wood
(74) *Attorney, Agent, or Firm*—Smith-Hill and Bedell

(57) ABSTRACT

A computer system has an input system and an output system. Program code to be debugged has a plurality of program code statements. The input system is utilized to indicate an error variable in the program code. The error variable has an error value that differs from a desired value. An error set of the error variable is obtained, which is a subset of the statements in the computer readable code. Each statement in the error set is relationally connected to the error variable. A priority value is given to each statement in the error set. The priority values indicate a computed probability that the associated statement is an error source of the error variable. Finally, the output system is used to present each statement in the error set in an ordered manner according to the priority values.

29 Claims, 4 Drawing Sheets

```
input     PI1,PI2,PI3,PI4;
output    PO2,PO1 ;
assign    sel1= PI1&PI2;          20
assign    sel2= PI3|PI4;          21
assign    w1 = PI2^PI3;           22
assign    PO2= w2|PI1 ;           23
always @ (sel1,w1,w2)             24
begin
        case (sel1)               25
        0 : PO1=w1 ;              26
        1 : PO1=w2;               27
        default : PO1=w1 ;        28
        endcase
end
always @ (sel2,PI1,PI3,PI4)       29
begin
        if (sel2)                 30
            w2=PI3;               31
        else
            w2=PI4;               3b
end
```

Fig. 2

PRIORITIZED DEBUGGING OF AN ERROR SPACE IN PROGRAM CODE

BACKGROUND OF INVENTION

1. Field of the Invention

The present invention relates to debugging software. Specifically, the present invention discloses a system and method that algorithmically determines the probability of a line of source code as being an error source in the error space of a variable.

2. Description of the Prior Art

Software is becoming increasingly common across a broad spectrum of fields. Correspondingly, a number of software tools and packages have come onto the market to help with the automation and computerization of tasks that were once done manually. Many of these tools are robust, presenting themselves as highly specific programming languages to flexibly accomplish tasks in a narrow field. This results in more people than ever, who never initially considered themselves as programmers, being faced with the task of debugging faulty code. An excellent example of this is in the field of integrated circuit (IC) development. Nowadays, ICs are being designed not on paper, but coded as instructions in a hardware development language (HDL). These circuits are not tested and debugged with physical elements, but virtually by way of simulators that execute the HDL code. When the HDL code is considered bug-free, and hence the under-lying circuits that are described by this code are considered error-free, the HDL code is "compiled" into the corresponding circuit elements for wafer manufacturing. More than ever, circuit designers are not tinkering with physical elements, but instead with lines of computer-readable and executable code that simulates these elements. A direct effect of this is that, to improve efficiency, means must be found to help programmers quickly and easily locate the sources of bugs in computer code.

The tried-and-true method for finding bugs in computer code is by tracing and breakpoints. A programmer sets breakpoint conditions that cause the computer to stop executing at a particular line of code, under particular memory read/write conditions, or by other methods. The most common is simply to set a breakpoint at a line of code. Every time the computer reaches the breakpoint, execution of the program stops and the programmer can use a debugger to check the contents of the memory and processor. Typically, breakpoints are set at the end of loops to determine if the loop of code has executed as desired. Breakpoints are also frequently set at the beginning of a subroutine when the subroutine is known to be behaving incorrectly. The programmer can then trace through the execution of each line of code in the subroutine individually to find the related bug.

All of this is extremely time consuming. Computer code frequently runs into the thousands of lines, and many of these lines may be individually executed thousands of times before a bug manifests itself. In turns of time resources spent debugging, it is invariably inefficient, and sometimes impossible, for a programmer to manually trace through code to find a bug.

SUMMARY OF INVENTION

It is therefore a primary objective of this invention to provide a method and system that presents lines of code to a programmer in an ordered fashion indicating which of the lines of code are most likely to be a source of error for a variable in a program.

The present invention, briefly summarized, discloses a method and corresponding system for assisting with debugging program code in a debugger on a computer system. The computer system has an input system and an output system. The program code has a plurality of program code statements. The input system is utilized to indicate an error variable in the program code. The error variable has an error value that differs from a desired value. An error set of the error variable is obtained, which is a subset of the statements in the computer readable code. Each statement in the error set is relationally connected to the error variable. A priority value is given to each statement in the error set. The priority values indicate a computed probability that the associated statement is an error source of the error variable. Finally, the output system is used to present each statement in the error set in an ordered manner according to the priority values.

It is an advantage of the present invention that by presenting the statements in the error set in a ordered manner according to the priority values, a user debugging the code can quickly refer to those lines of code that are deemed to be the most probable sources of the bug. Debugging times are thereby considerably shortened.

These and other objectives of the present invention will no doubt become obvious to those of ordinary skill in the art after reading the following detailed description of the preferred embodiment, which is illustrated in the various figures and drawings.

BRIEF DESCRIPTION OF DRAWINGS

FIG. 2 illustrates the sample code of FIG. 1 with a bug.

DETAILED DESCRIPTION

Figure 1:
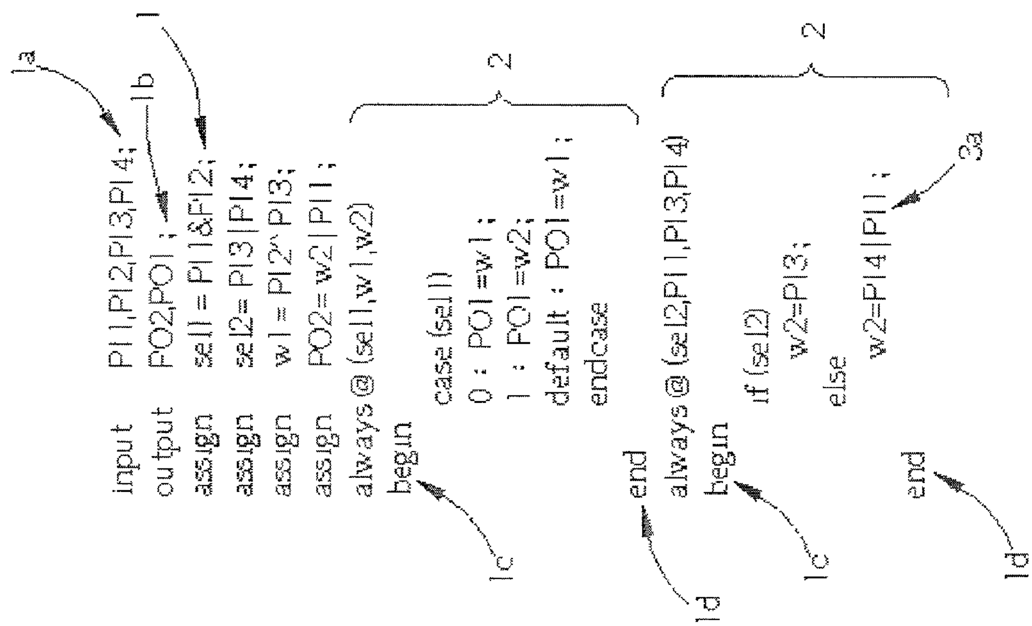
FIG. 1 illustrates lines of sample source code.

Please refer to FIG. 1. FIG. 1 shows an example of hardware development language (HDL) code. The method of the present invention is particularly well suited for the debugging of HDL code, as HDL code is executed repetitively in a series of discrete execution cycles. Each execution cycle may be thought of as a machine clock tick for the circuitry that the HDL code is used to simulate. As the circuitry should have well-defined outputs for each clock tick, the variables that represent circuit outputs may be checked at each execution cycle against desired results to look for bugs. In this manner, a person debugging the code may learn that a bug has cropped up in a particular execution cycle. The method of the present invention shall be explained by way of a specific example of incorrect code.

As can be seen, the HDL code of FIG. 1 comprises a plurality of program code statements 1. Program code statements 1 can be logically grouped together to form subroutines 2. All of this should be obvious to one reasonably skilled in the art of computer programming and debugging. It should be noted that the subroutines 2 each begin with a program code statement 1 that starts "always @( . . . )". This indicates that the program code statements 1 within the subroutine 2 are always executed with each simulated clock tick. The program code of FIG. 1 may be thought of as being enclosed within a large execution loop (analogous to "for" statements in C, Pascal, BASIC, etc.), each iteration of the loop corresponding to a circuit clock cycle, and the subroutine statements 2 are executed with each iteration of the loop to simulate a circuit clock tick.

The circuit has a plurality of primary inputs, as defined by program code statement 1*a* with variables PI1, PI2, PI3 and PI4, and a plurality of primary outputs as defined by program code statement 1*b* with variables PO1 and PO2. The primary inputs are manipulated in each execution cycle to generate the primary outputs. Generally speaking, when testing the accuracy of the program code, with each execution cycle the values of the primary output variables are compared against their desired values, as required by a circuit specification. If, in an execution cycle, a primary output variable does not agree with its desired value, then a bug is said to be in the program code, and the variable associated with the primary output is the error variable. The execution cycle in which the error occurs is termed the error cycle.

Simply identifying that a bug exists is the first step in removing the bug from the computer code. The second step is to find the source of the bug, and it is the object of the present invention to provide aide with respect to this second step. The sources of bugs are multifarious, and the symptoms of a bug may not appear for many execution cycles, under highly specific input conditions. Consider, for the following example, the computer code of FIG. 2 in conjunction with that of FIG. 1. FIG. 2 shows computer code much like that of FIG. 1, but with a bug in program code statement 3*b*. FIG. 1 depicts a correct program code statement 3*a*: "w2=PI4|PI1;". In FIG. 2, the program code statement 3*b* contains an incorrect line, "w2=PI4;". That is, the variable w2 is directly assigned the value of the primary input PI4, rather than being assigned the logical OR of the primary inputs PI4 and PI1. Because the variable w2 is not a primary output variable, the effect of this bug may not become immediately obvious. That program code statement 3*b* has a bug may only become clear when the program code of FIG. 2 is run and compared against desired results. It should be noted that, in FIGS. 1 and 2, the symbol "&" indicates a logical AND, and "^" a logical XOR. The symbol "|" is, as indicated in the above, a logical OR.

For the following example, suppose that in the first execution cycle the primary inputs are set as follows: PI1=1, PI2=1, PI3=1, PI4=0

For the circuit represented by the code of FIG. 2, the primary outputs have the following desired values: PO1=1, PO2=1

When the code is executed, after the first execution cycle, the following values are found for the variables PO1 and PO2: PO1=1, PO2=1

Thus, the desired values of the primary outputs matches the actual values of the related primary output variables, and the bug in the program code statement 3*b* passes by undetected after the first execution cycle. For all intents and purposes, the computer code of FIG. 2 is bug-free for the first execution cycle.

The second execution cycle performs as follows: Primary inputs:PI1=0, PI2=1, PI3=0, PI4=1 Desired outputs:PO1=1, PO2=0 Actual outputs:POI=1, PO2=0

And, again, no bugs are detected. However, in the third execution cycle the following occurs: Primary inputs:PI1=1, PI2=1, PI3=0, PI4=0 Desired outputs:PO1=1, PO2=1 Actual outputs:POI=0, PO2=1

In this case, the bug in program code statement 3*b* finally presents itself. The actual output of the primary output variable PO1, a value of 1, differs from its desired output of 0 that is required by the circuitry specifications. PO1 is thus the error variable, and execution cycle number 3 is the error cycle.

Figure 3:
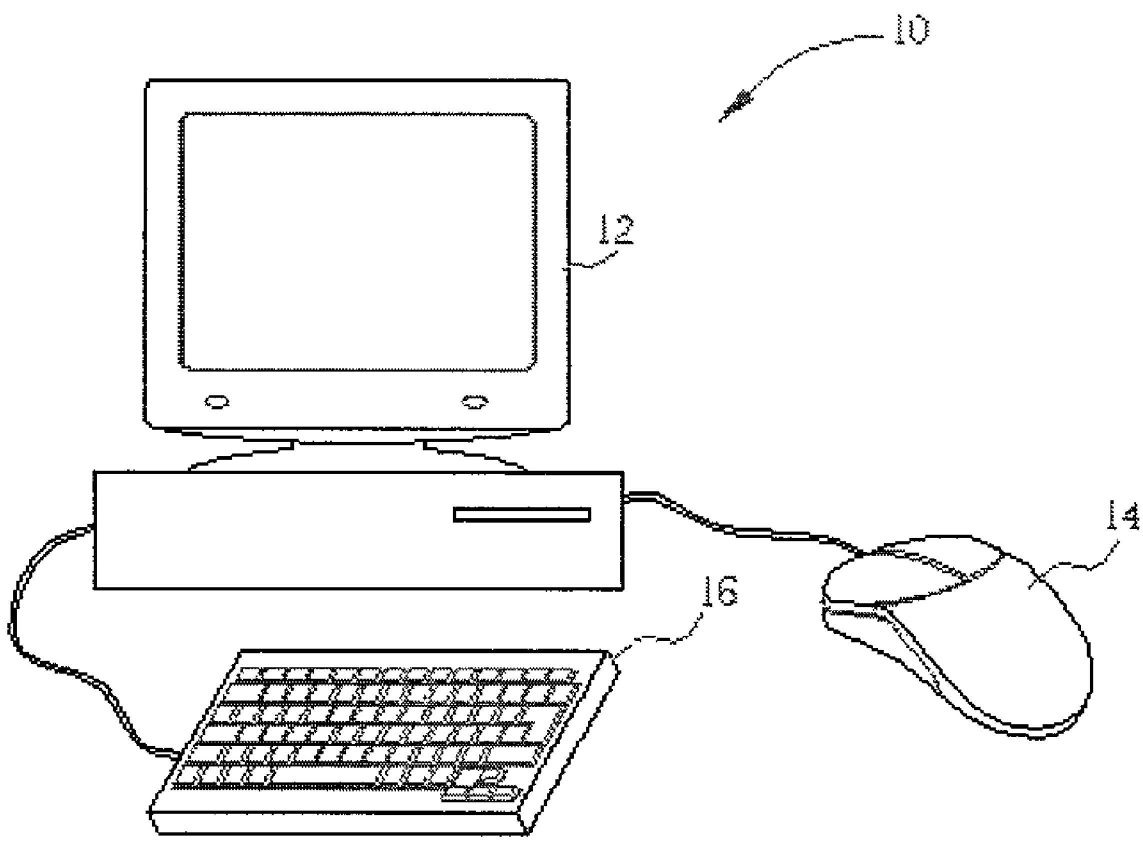
FIG. 3 is a perspective view of a computer system that utilizes the method of the present invention.

Please refer to FIG. 3 in conjunction with FIGS. 1 and 2. FIG. 3 is a perspective view of a computer system 10 that utilizes the method of the present invention. The computer system 10 includes a display 12 as an output system, and a mouse 14 with a keyboard 16 as an input system. To find which of the program code statements 1 are most likely to be responsible for the bug, a user first uses the mouse 14 or keyboard 16 to indicate one or more error variables. In this case, the error variable would be PO1. The user also indicates which execution cycle is the error cycle. In this case, the error cycle is cycle number 3. The computer system 10 then implements the following method to present on the display 12 an ordered list of the most likely lines of program code statements 1 that are responsible for the bug.

To begin, an error set of the error variable is found. To do this, the relation space of the error variable is used, which is all program code statements 1 that are relationally connected to the error variable. This relation space can be termed the error space of the program code, for it includes all program code statements 1 that are directly or indirectly responsible for setting the value of the error variable (i.e., PO1). In the worst case, the error space could include the entirety of the program code. In the simplest case, the error space would include only one program code statement 1. Using the present example, as noted, the error variable is PO1. The most obvious program code statement that is relationally connected to PO1 is program code statement 26. It is noted that program code statement 26 involves variable w1, whose value is assigned at program code statement 22. What value is assigned to PO1 depends on the "case" statement in program code statement 25. Program code statement 25, in turn, relies on the variable sell, which is assigned in program code statement 20. Continuing this process, it is clear that a rapid fan-out of inter-related variables causes PO1 to be relationally connected to almost every line in the program code of FIG. 2. Indeed, the final error space is found to be (indicated by item numbers): Error space={20, 21, 22, 24, 25, 26, 27, 28, 29, 30, 31, 3*b*}

About the only program code statement that is not relationally connected to PO1 is program code statement 23, which simply assigns a value to primary output variable PO2. For these purposes, the relatively simple input/output variable declarations of 1*a* and 1*b* are ignored, as well as block nesting identifiers "begin" 1*c* and "end" 1*d*, as they can have no direct influence on the value of error variable PO1.

It would help considerably if the error space could be narrowed down. Ideally, this should be done without removing the program code statement that is responsible for the bug, i.e., program code statement 3*b*. To narrow the error space, and thus generate the error set, the execution set is considered. This execution set is the set of all program code statements that are executed in the error cycle. Indicated with item numbers, the execution set for the present example is: Execution set={20, 21, 22, 23, 24, 25, 27, 29, 30, 3*b*}

To obtain the error set, the relation space for the error variable is considered only in the context of the execution set. That is, only program code statements in the execution set that are relationally connected to the error variable are used to generate the error set. It is noted, for example, that program code statement 26 is not in the execution set, and thus is not relationally connected to the error variable PO1 with respect to the executions set, though it is in the error space. To generate the error set, each item in the execution set is checked for relational dependency with the error variable PO1, in much the same manner that the error space is found. The error set, as a sub-set of the execution set, is found to be: Error set={20, 21, 24, 25, 27, 29, 30, 3*b*}

Note, in particular, that program code statements 22 and 23, which are both in the execution set, are not in the error set. Program code statement 23 is not in the error set because it was never in the error space to begin with, and thus could not possibly be relationally connected to the error variable PO1. On the other hand, program code statement 22 is in the error space, yet it is not in the error set. This is because program code statement 22 assigns a value to variable w1 and, within the error cycle, the value of w1 is never used in any way to influence the value of the error variable PO1. Program code statement 22 is thus not relationally connected to the error variable PO1 within the context of the execution set. The program code statements in the error set are considered the most likely candidates for the source of the bug. The primary objective of the present invention is to prioritize these program code statements as more or less likely sources of the bug, and thereby more quickly speed a programmer to the target source of the bug.

To obtain a computed probability that a program code statement in the error set is the source of the bug, previous execution cycles are used in conjunction with one or more correct variables. A correct variable is any variable whose value matches its desired value in the error cycle. For the present example, the primary output variable PO2 is considered as a correct variable. The correct variable is preferably a primary output variable, or one with many relational dependencies with the error variable. The number of execution cycles that are used before the error cycle may be configured as deemed best. Generally speaking, the more execution cycles used, the better the results of the prioritization. However, more execution cycles can lead to slower processing times, and heavier demands on computer resources. For the present example, the first two execution cycles are considered. That is, the first two execution cycles before the error cycle are considered, with PO2 as the correct variable, since PO2 has a value of one in the error cycle that agrees with its desired value of one.

Initially, a set of priority values is created and initialized so that each member of the set is zero. Each priority value in the set of priority values directly corresponds to one of the program code statements in the error set, and indicates a computed probability that the related program code statement is an error source (i.e., bug) for the error variable. For the present example, a higher priority value will indicate that the related program code statement in the error set is a less likely source of the bug. We thus have: Error set:{20,21,24, 25,27,29,30,3*b*} Priority values:{0,0,0,0,0,0,0,0}

The first execution cycle is considered. A first sensitized set for the correct variable in the first execution cycle is obtained. A sensitized set is analogous to the error set, and is found in much the same manner, except that the correct variable PO2 is considered, and statements executed in the first execution cycle are considered. To put this another way, the error set above is simply a sensitized set for the error variable PO1 in the error cycle, i.e., the third execution cycle. However, only program code statements in the error set are permitted in a sensitized set. Thus, to build a sensitized set, three parameters must be known: the variable to be considered, the execution cycle in which the executed program code statements are parsed to determine if they are relationally connected to the variable under consideration, and the error set. With the present example, a first execution set is constructed, which contains all of the program code statements executed in the first execution cycle (indicated by item numbers): First execution set={20, 21, 22, 23, 24, 25, 27, 29, 30, 31}

Program code statements in the first execution set that are relationally connected to the correct variable PO2 are then used to generate the first sensitized set. For example, program code statement 23 actually assigns a value to the correct variable PO2. This assignment, in turn, depends on the variable w2. Variable w2 is assigned in program code statement 31. This is due to the "if" statement of program code statement 30, embedded in the subroutine defined by program code statement 29, and which, in turn, depends on variable sel2. Variable sel2 is assigned a value in program code statement 21 from a logical OR of two primary inputs, PI3 and PI4. This yields then, in item numbers, a preliminary set for the correct variable PO2:

Preliminary set={21, 23, 29, 30, 31}

To generate the first sensitized set for the correct variable PO2, the preliminary set is intersected with the error set to yield: First sensitized set={21, 29, 30}

For every program code statement in the first sensitized set, a value of one is added to the corresponding element in the priority set, which acts as a scaling function that indicates a reduced computed probability of the related program code statement as being a source of the bug: Sensitized set:{21,29,30} Error set: {20,21,24,25,27,29,30,3*b*} Priority values:{0,0+1,0,0,0,0+1,0+1,0}

Program code statements 21, 29 and 30 each thereby acquire a priority of one, indicating that they have a reduced computed probability that they are sources of the bug.

For the same execution cycle, a second sensitized set is also found for the error variable PO1. The first execution set is thus used, together with the error set, to obtain the second sensitized set. The procedure iterated above is used to obtain:

Second sensitized set={20, 21, 24, 25, 27, 29, 30}

Analogously, for every program code statement in the second sensitized set, a value of one is added to the corresponding element in the priority set to indicate reduced computed probabilities for these program code statements as being bug sources: Sensitized set:{20,21,24,25,27,29,30} Error set:{20,21,24,25,27,29,30,3*b*} Priority values:{0+1, 1+1,0+1,0+1,0+1,1+1,1+1,0}

This completes the analysis for the first execution cycle. At this point, the highest contender for the source of the bug is program code statement 3*b*, with a priority value of zero. The lowest contenders are program code statements 21, 29 and 30, with priority values of 2. The other program code statements 20, 24, 25, and 27 lie in-between these two extremes, with a priority value of one each.

The above procedure is repeated for execution cycle 2. This requires a second execution set indicating all of the program code statements executed in the second execution cycle: Second execution set={20, 21, 22, 23, 24, 25, 26, 29, 30, 31}

A third sensitized set is found, which is for the correct variable PO2 in the second execution cycle. A fourth sensitized set is also found, which is for the error variable PO1 in the second execution cycle. These are found to be (using item numbers): Third sensitized set={21, 29, 30} Fourth sensitized set={20, 24, 25}

It is worth noting that the fourth sensitized set is so small because, in the second execution cycle, as indicated by the second execution set, the program code statement 27 is not executed. The error variable PO1 thus has no relational connection with the variable w2, and hence all program code statements relationally connected to the variable w2 are left out of the fourth sensitized set. The third and fourth sensitized sets are used to adjust the corresponding priority values within the priority set, yielding: Error set:{20,21,24,25,27, 29,30,3*b*} Priority values: {2,3,2,2,1,3,3,0}

The error set is then sorted based on the priority set, from most-likely error source to least-likely error source: Error set:{3*b*,27,20,24,25,21,29,30} Priority values: {0,1,2,2,2,3, 3,3}

Finally, the program code statements in the error set are presented on the display 12 in their sorted order, with their corresponding priority scores, an example of which is presented below: Line 20:w2=PI4 (Score:0) Line 11:PO1=w2 (Score:1) Line 3:assign sel1=PI1 & PI2 (Score:2) Line 7:always @(sel1, w1, w2) (Score:2) Line 9:case (sel1) (Score:2) Line 4:assign sel2=PI3|PI4 (Score:3) Line 15:always @(sel2, PI1, PI3, PI4) (Score:3) Line 17:if (sel2) (Score:3)

Line 20, which is, in fact the error source, is properly identified as the program code statement having the highest computed probability of being the error source of the bug.

The above example has been presented with a very simple fragment of computer code. As such, only one correct variable, PO2, is used. However, in practice, a plurality of correct variables will be used to generate the priority values held in the priority set, and these may be selected by the user, or chosen automatically. Additionally, the user may also select a plurality of error variables. In this case, the error set would be the union of the individual error sets of each error variable. The basic method presented above would, however, remain the same. It should be obvious that the actual program code statements 1 are not contained within the sensitized sets or the error set. Rather, these sets hold pointers, source code line numbers, or other similar indicators, to reference the appropriate program code statements. Also, above, a constant value (namely one) is added to each priority value that corresponds to a program code statement held within a sensitized set. This is the simplest manner of performing a scaling function. Other scaling functions are also possible, and could be quite complex in nature. What is of importance, though, is that, regardless of the method used, for each program code statement in a sensitized set, the scaling function set a reduced computed probability of the program code statement being an error source.

Figure 4:
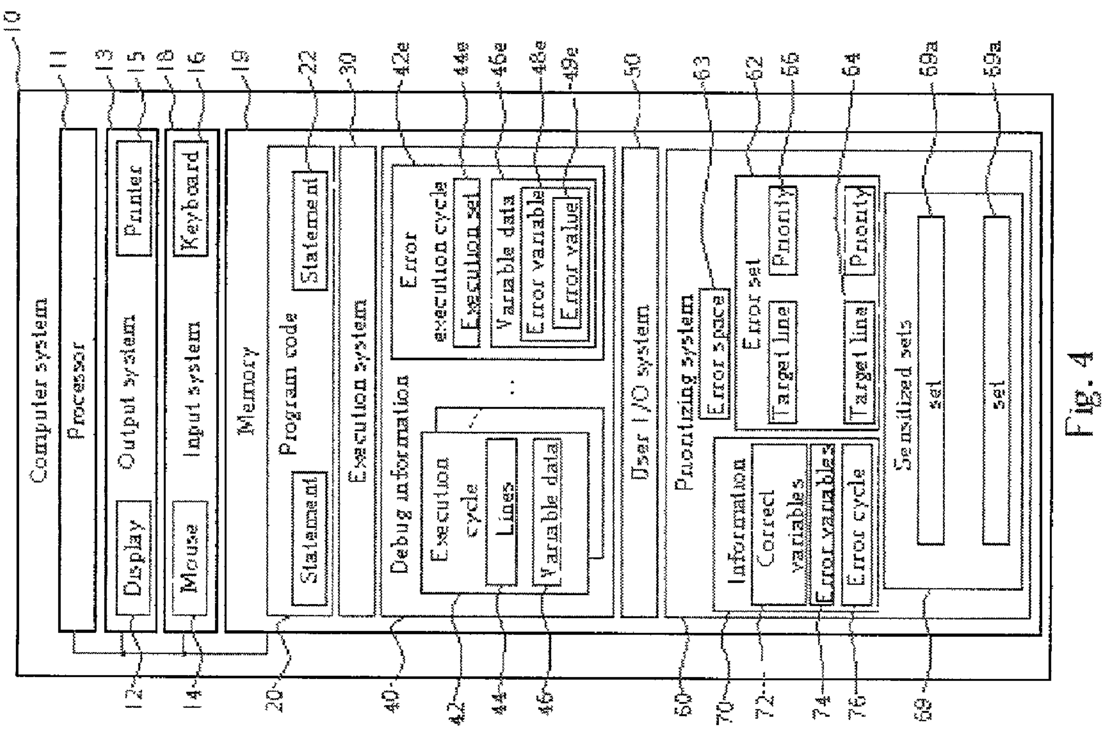
FIG. 4 is a block diagram of the computer system shown in FIG. 3.

The method of the present invention is intended to be implemented on a computer system, such as the computer system 10, as a convenient feature within a program debugging tool. Please refer to FIG. 4 in conjunction with FIG. 3. FIG. 4 is a block diagram of the computer system 10 of FIG. 3. The computer system 10 has an output system 13, which includes the display 12 and may include a printer 15. The computer system 10 also has an input system 18, which includes the mouse 14 and keyboard 16. Additionally, the computer system 10 comprises a processor 11 and memory 19. The processor 11 executes programs in the memory 19, and uses the memory 19 to store data.

The memory 19 includes program code 20, an execution system 30, debug information 40, a user input/output (I/O) system 50, and a prioritizing system 60. The program code 20 comprises a plurality of program code statements 22, as previously illustrated in FIG. 1 . The execution system 30 is used to execute the program code 20 to generate the debug information 40. The execution system 30 can be an interpreter, a combination of compiler and debugger (a so-called development system), or may simply be a compiled version of the program code 20 with appropriate instructions embedded therein to generate the debug information 40. The debug information 40 comprises data about the execution of the program code 20, and this data can be organized into a plurality of execution cycle blocks 42. Each execution cycle block 42 contains all the data needed by the prioritizing system 60 to generate a sensitized set for a respective execution cycle of the program code 20, such as lines 44 that indicate program code statements 22 that were executed in the respective execution cycle, and variable data 46 that holds the values of variables in the program code 20 at the end of the respective execution cycle. In particular, the debug information will hold information about an error execution cycle 42*e*, in which an error variable 46*e* obtains an error value 49*e* that disagrees with a desired value. With reference to the example above, the error execution cycle 42*e* would thus be the third execution cycle. The error variable 48*e* would be the variable PO1, and the error value 49*e* would be one, disagreeing with the desired value of zero. Execution set 44*e* contains the program code statements 22 that are executed within the error execution cycle 42*e*, and would correspond to the execution set of the above example.

The user I/O system 50 is used to present data to the user by way of the display 12 or printer 15, and to obtain data from the user by way of the mouse 14 and keyboard 16. In a development system, the user I/O system 50 is the heart of the system 10, presenting the program code 20 to the user for editing and review, enabling the user to control the execution system 30 to trace through the program code 20 while viewing the contents of the processor 11 and memory 19, permitting the user to view the contents of the debug information 40, and performing a host of other tasks.

The prioritizing system 60 interfaces with the user I/O system 50 to implement the present invention method. The prioritizing system 60 utilizes the user I/O system 50 to obtain information 70 from the user, such as correct variables 72 (i.e., PO2 in the example above), error variables 74 (i.e., PO1), the error cycle 76, the number of cycles to process prior to the error cycle, and any other relevant information. In particular, the error cycle 76 should correspond with the error execution cycle 42*e* if one of the error variables 74 is the error variable 48*e*. With this information obtained from the user, the prioritizing system 60 then parses the program code 20 to obtain the error space 63, and analyzes the debug information 40 with respect to the program code 20 and the error space 63 to obtain the error set 62 and sensitized sets 69. As noted previously, the error space 63 contains references to all program code statements 22 that are relationally connected to the error variables 74. The error set 62 comprises a plurality of target lines 64 with corresponding priorities 66. Each target line 64 is in the error space 63 and corresponds to one of the program code statements 22 within the program code 20. Each priority 66 is the computed probability that the related target line 64 is an error source within the program code 20. The user I/O system 50 then presents, on the display 12 (or printed out with the printer 15), the error set 62 and related priorities 64 in a manner sorted according to the priorities 64, with a target line 64 having the highest computed probability of being an error source being displayed first. As previously discussed, the sensitized sets 69 are used to generate the priority values 66. Each set 69*a* within the sensitized sets 69 corresponds to one of the execution cycles 42 prior to the error execution cycle 42*e*, and is with respect to either one of the correct variables 72 or one of the error variables 74.

The prioritizing system 60 contains a function call that returns a sensitized set 69*a* given the three inputs noted in the above example. That is, within the prioritizing system 60, a pseudo-code routine for returning a sensitized set 69*a* has the form: Sensitized set=GetSensitizedSet(variable, execution cycle, error set);

This pseudo-code subroutine returns a sensitized set 69*a* as desired based upon the three input parameters: a correct variable 72 or error variable 74, an execution cycle 42, and the error set 60. For example, the first sensitized set discussed in the example above would have a pseudo-code call that looks like: First sensitized set=GetSensitizedSet(PO2, first execution set, error set);

The second sensitized set discussed in the example above would have a pseudo-code call that looks like: Second sensitized set=GetSensitizedSet(PO1, first execution set, error set);

The benefit of the above is that the error set 62 can be found simply as a sensitized set, using the error variables 74, the error cycle 76, and the error space 63 as the three input parameters, respectively.

Although the above method and corresponding system have been presented by way of example with HDL code, it should be clear to one in the art that the present invention method is suitable for not only HDL code but any type of computer code that contains a repetitively executed loop within which a bug is known to exist.

In contrast to the prior art, the present invention identifies, and prioritizes, program code statements as being error sources within a program. These prioritized program code statements are presented to the user in order, from most-likely error source to least-likely error source. The user thus need not trace through code looking for likely sources of a bug, but instead needs only to identify a variable that is known to be incorrect, an execution cycle in which the bug occurs, and any correct variables within this buggy execution cycle. The prioritizing system according to the present invention method then performs parsing and post-process analysis of the program code to find most likely culprit program code statements and present them to the user.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for aiding debugging of program code in a computer system, the computer system comprising an input system and an output system, the program code comprising a plurality of program code statements, the method comprising:

utilizing the input system to indicate an error variable in the program code, the error variable containing an error value that differs from a first desired value;

obtaining an error set of the error variable, the error set comprising a subset of the program code statements, each program code statement in the error set being relationally connected to the error variable;

assigning a priority value to each program code statement in the error set, each priority value indicating a computed probability that the associated program code statement is an error source of the error variable; and the output system presenting each statement in the error set based on the relative ordering of the priority value of the program code statement to the other priority values of the other program code statements in the error set.

2. The method of claim 1 wherein the program code statements in the error set are presented in order from a most-likely error source to a least-likely error source.

3. The method of claim 1 wherein each program code statement in the error set is presented with the associated priority value.

4. The method of claim 1 wherein the program code is repetitively executed by way of a plurality of execution cycles, and obtaining the error set comprises:

obtaining an error cycle that is an execution cycle in which the error variable obtains the error value;

obtaining an execution set comprising all program code statements that are executed in the error cycle; and utilizing the program code statements in the execution set to generate the error set, every program code statement in the error set being in the execution set and also being relationally connected to the error variable.

5. The method of claim 4 wherein the program code comprises a correct variable, the correct variable having a value that agrees with a second desired value in the error cycle, and wherein the step of assigning the priority value to each program code statement in the error set comprises:

for a first execution cycle prior to the error cycle, obtaining a first sensitized set for the correct variable, the first sensitized set comprising at least a program code statement that is relationally connected to the correct variable, that is executed in the first execution cycle, and that is in the error set; and for each program code statement in the first sensitized set, applying a scaling function to the priority value associated with the identical program code statement in the error set, the scaling function setting a reduced computed probability that the associated program code statement in the program code is the error source of the error variable.

6. The method of claim 5 wherein the scaling function adds a constant value to the I priority value associated with the identical program code statement in the error set.

7. The method of claim 5 wherein a second sensitized set is additionally obtained for the error variable, the second sensitized set comprising at least a program code statement that is relationally connected to the error variable, that is executed in the first execution cycle, and that is in the error set, and for each program code statement in the second sensitized set, the scaling function is applied to the priority value associated with the identical program code statement in the error set.

8. The method of claim 5 wherein a plurality of execution cycles prior to the error cycle are utilized to assign the priority values.

9. The method of claim 5 wherein a plurality of correct variables are utilized to assign the priority values.

10. The method of claim 1 wherein the program code is hardware development language (HDL) code.

11. A method for aiding debugging of program code in a computer system, the computer system comprising an input system and an output system, the program code comprising a plurality of program code statements that are repetitively executed by way of a plurality of execution cycles, the method comprising:

utilizing the input system to indicate an error variable in the program code, the error variable containing an error value that differs from a first desired value;

obtaining an error cycle that is an execution cycle in which the error variable obtains the error value;

obtaining an execution set comprising all program code statements that are executed in the error cycle;

utilizing the program code statements in the execution set to generate an error set of program code statements, every program code statement in the error set being in the execution set and also being relationally connected to the error variable;

assigning a priority value to each program code statement in the error set, each priority value indicating a computed probability that the associated program code statement in the error set is an error source of the error variable; and output system presenting each statement in the error set based on the relative ordering of the priority value of the program code statement to the other priority values of the other program code statements in the error set.

12. The method of claim 11 wherein the statements in the error set are presented in order from a most-likely error source to a least-likely error source.

13. The method of claim 11 wherein each statement in the error set is presented with the associated priority value.

14. The method of claim 11 wherein the program code comprises a correct variable, the correct variable having a value that agrees with a second desired value in the error cycle, and wherein the step of assigning the priority value to each program code statement in the error set comprises:

for a first execution cycle prior to the error cycle, obtaining a first sensitized set for the correct variable, the first sensitized set comprising at least a program code statement that is relationally connected to the correct variable, that is executed in the first execution cycle, and that is in the error set; and for each program code statement in the first sensitized set, applying a scaling function to the priority value associated with the identical program code statement in the error set, the scaling function setting a reduced computed probability that the identical program cede statement is the error source of the error variable.

15. The method of claim 14 wherein the scaling function adds a constant value to the priority value associated with the related program code statement in the error set.

16. The method of claim 14 wherein a second sensitized set is additionally obtained for the error variable, the second sensitized set comprising at least a program code statement that is relationally connected to the error variable, that is executed in the first execution cycle, and that is in the error set, and for each program code statement in the second sensitized set, the scaling function is applied to the priority value associated with the identical program code statement in the error set.

17. The method of claim 14 wherein a plurality of execution cycles prior to the error cycle are utilized to assign the priority values.

18. The method of claim 14 wherein a plurality of correct variables are utilized to assign the priority values.

19. The method of claim 11 wherein the program code is hardware development language (HDL) code.

20. A computer system comprising:

a processor;

an output system for presenting information to a user;

an input system for obtaining data from the user; and a memory for storing code and data for the processor, the memory comprising:

program code comprising a plurality of program code statements;

debug information about the program code;

an execution system for generating the debug information; and a prioritizing system, executed by the processor, that utilizes the debug information to perform the following:

utilizing the input system to indicate an error variable in the program code, the error variable containing an error value that differs from a first desired value;

obtaining an error set of the error variable, the error set comprising a subset of the program code statements, each program code statement in the error set being relationally connected to the error variable;

assigning a priority value to each program code statement in the error set, each priority value indicating a computed probability that the associated program code statement is an error source of the error variable; and the output system presenting each program code statement in the error set based on the relative ordering of the priority value of the program code statement to the other priority values of the other program code statements in the error set.

21. The computer system of claim 20 wherein the program code statements in the error set are presented in order from a most-likely error source to a least-likely error source.

22. The computer system of claim 20 wherein each program code statement in the error set is presented with the associated priority value.

23. The computer system of claim 20 wherein the program code is repetitively executed by the execution system in a plurality of execution cycles, and obtaining the error set comprises:

obtaining an error cycle that is an execution cycle in which the error variable obtains the error value;

obtaining an execution set comprising all program code statements that are executed in the error cycle; and utilizing the program code statements in the execution set to generate the error set, every program code statement in the error set being in the execution set and also being relationally connected to the error variable.

24. The computer system of claim 23 wherein the program code comprises a correct variable, the correct variable having a value that agrees with a second desired value in the error cycle, and wherein the step of assigning the priority value to each program code statement in the error set comprises:

for a first execution cycle prior to the error cycle, obtaining a first sensitized set for the correct variable, the first sensitized set comprising at least a program code statement that is relationally connected to the correct variable, that is executed in the first execution cycle, and that is in the error set; and for each program code statement in the first sensitized set, applying a scaling function to the priority value associated with the identical program code statement in the error set, the scaling function setting a reduced computed probability that the associated program code statement in the program code is the error source of the error variable.

25. The computer system of claim 24 wherein the scaling function adds a constant value to the priority value associated with the identical program code statement in the error set.

26. The computer system of claim 24 wherein a second sensitized set is additionally obtained for the error variable, the second sensitized set comprising at least a program code statement that is relationally connected to the error variable, that is executed in the first execution cycle, and that is in the error set, and for each program code statement in the second sensitized set, the scaling function is applied to the priority value associated with the identical program code statement in the error set.

27. The computer system of claim 24 wherein a plurality of execution cycles prior to the error cycle are utilized to assign the priority values.

28. The computer system of claim 24 wherein a plurality of correct variables are utilized to assign the priority values.

29. The computer system of claim 20 wherein the program code is hardware development language (HDL) code.

* * * * *